US008123182B2

(12) United States Patent
Sonntag et al.

(10) Patent No.: US 8,123,182 B2
(45) Date of Patent: Feb. 28, 2012

(54) MOUNTING SYSTEM FOR DISPLAY EQUIPMENT

(75) Inventors: Rainer Sonntag, Haunetal (DE); Carsten Hüge, Wehretal (DE); Gottfried Wolf, Sollstedt (DE)

(73) Assignee: Ondal Holding GmbH, Hunfeld (DE)

( * ) Notice: Subject to any disclaimer, the term of this patent is extended or adjusted under 35 U.S.C. 154(b) by 0 days.

(21) Appl. No.: 12/918,303

(22) PCT Filed: Feb. 18, 2009

(86) PCT No.: PCT/EP2009/001138
§ 371 (c)(1), (2), (4) Date: Feb. 8, 2011

(87) PCT Pub. No.: WO2009/103503
PCT Pub. Date: Aug. 27, 2009

(65) Prior Publication Data
US 2011/0127397 A1    Jun. 2, 2011

(30) Foreign Application Priority Data
Feb. 19, 2008 (EP) ..................... 08003034

(51) Int. Cl.
*A47B 96/00* (2006.01)
(52) U.S. Cl. .................. 248/220.22; 248/309.1; 248/917
(58) Field of Classification Search ............. 248/220.22, 248/222.14, 276.1, 674, 223.41, 309.1, 917; 403/353
See application file for complete search history.

(56) References Cited

U.S. PATENT DOCUMENTS
5,143,331 A * 9/1992 Robert ......................... 248/27.1
7,316,378 B1 1/2008 Curran et al.
2005/0068718 A1 3/2005 Cheng et al.
2005/0082453 A1 4/2005 Chuang
2005/0284991 A1 12/2005 Saez
2007/0041213 A1 2/2007 Short et al.
2009/0178772 A1* 7/2009 Birkkjaer ..................... 160/371

FOREIGN PATENT DOCUMENTS
DE        10351870 B3    5/2005
EP         1408272 A1    4/2004
* cited by examiner

*Primary Examiner* — Ramon Ramirez
(74) *Attorney, Agent, or Firm* — Seed IP Law Group PLLC

(57) ABSTRACT

The present invention provides a mounting system for securely mounting display equipment, such as a monitor or a display screen. The mounting system comprises: a support structure (5) to which the display equipment (D) is to be mounted to thereby support the display equipment (D); and a mounting component (1) adapted to be rigidly attached to the display equipment, the mounting component (1) comprising mounting means (4) for mounting the display equipment to the support structure (5). The support structure (5) comprises a first support frame (10), the first support frame having a plurality of connection means (12) for secure connection with the mounting means (4) of the mounting component (1). In one aspect of the invention, the plurality of connection means (12) are arranged and adapted for selective connection with the mounting means (4) thereby to select and/or adjust the position of the display equipment (D) in two dimensions relative to the support structure (5). Thus, the plurality of connection means (12) are distributed in an array over an area of the first support frame (10) for selective connection with the mounting means (4), with each of the plurality of connection means (12) being adapted to engage and securely fasten with the mounting means (4) of the mounting component (1). In another aspect of the invention, the support structure (5) includes a second support frame (20), and the first support frame (10) is adapted for adjustable sliding movement relative to the second support frame (20).

29 Claims, 5 Drawing Sheets

MOUNTING SYSTEM FOR DISPLAY EQUIPMENT

TECHNICAL FIELD

The present invention relates to a mounting system and, more particularly, to a system for mounting display equipment.

The present invention has particular application to the mounting of equipment, such as a monitor or display screen. Indeed, the invention may be adapted for mounting a number of monitors or display screens in proximity to one another. It will be noted, however, that the invention is not limited to this application, but may be employed with other items of equipment.

BACKGROUND ART

During medical procedures conducted in the fields of, for example, cardiology, vascular surgery and electro-physiology, as well as in most procedures that involve endoscopy, the instruments employed typically provide the medical practitioners with a great deal of information. This information, which is obtained from probes and sensors in and on the body of the patient, is usually presented to the medical staff on monitors or display screens arranged in their immediate vicinity. Indeed, a number of separate monitors and display screens are often arranged next to one another for this purpose. For example, three, four, or even as many as eight or even ten individual monitors or display screens may be mounted adjacent one another during such a medical procedure.

In order to ensure that all of the information, including images and data, is optimally presented to the medical practitioners during the conduct of such a procedure, it is usually necessary that the individual monitors or display screens be arranged as close as possible to one another. To ensure good comparison of x-ray images, for example, it can be important to eliminate gaps or spaces between the monitors, to avoid the distracting influence of light infiltrating from behind the display system.

One known solution to this particular problem is to cover gaps between the separate monitors with strips or profiles of extruded rubber. These form a mask or shroud around the edges and between the display screens. This arrangement has the associated problem, however, that the rubber strips between the monitors tend to accumulate dust and dirt, and this leads to difficulties ensuring a hygienic operating environment for such medical procedures.

For arrangements of monitors that do not use rubber strips, especially when there are two or more different types of monitors involved, the time and effort required to adjust or replace the monitors is typically quite high. In particular, it becomes a complicated procedure to align the screens and to ensure that there are no gaps between different types of monitors having different shapes and sizes.

To provide freedom of movement of the monitors themselves, and also to ensure freedom of movement of the medical staff around the monitors, the monitors are often attached to pendant-systems suspended from the ceiling of the room in which the procedure is to take place. Importantly, however, such pendant-systems often involve extended arm arrangements and can be susceptible to vibration or flexing during service. This, in turn, can lead to vibration and movement of the monitors.

It is therefore important that the mounting of such monitors and display screens be stiff and light so that the monitors themselves are susceptible to minimal vibration or unwanted movement during service, and so that any vibrations or movements which do occur can subside quickly for further undisturbed operation.

A number of systems have hitherto been developed for mounting display devices, such as LCD screens and computer monitors, in the home and in the office environment. Examples of such systems are described in the U.S. Patent Publications U.S. Pat. No. 7,316,378 B1, US 2005/068718 A1, US 2005/284991 A1, and US 2007/041213 A1. These known systems, however, generally do not satisfy all of the requirements demanded by the medical environment, including hygiene, adjustability, modularity, and rigidity of the system, as discussed above.

SUMMARY OF THE INVENTION

Thus, the present invention is concerned with the provision of a new and improved mounting system for display equipment, which is able to address the problems associated with conventional mounting systems discussed above.

According to one broad aspect, the present invention provides a mounting system for securely mounting display equipment, such as a monitor or a display screen, the mounting system comprising: a support structure to which the display equipment is to be mounted to thereby support the display equipment; and a mounting component adapted to be securely attached to the display equipment, the mounting component comprising mounting means for mounting the display equipment to the support structure. The support structure comprises a first support frame having a plurality of connection means for secure connection with the mounting means of the mounting component. The plurality of connection means are arranged and adapted for selective connection with the mounting means of the mounting component so that an operator can readily select and/or adjust the position of the display equipment relative to the support structure.

That is, the plurality of connection means provided on the first support frame may be distributed over an area of the first support frame for selective connection with the mounting means, and each of the plurality of connection means is adapted to engage, and preferably securely fasten, with the mounting means. In this way, the first support frame provides the plurality of connection means at a range of different locations, so that by simply selecting the individual connection means to which the mounting means is to be connected, the position of the display equipment relative to the support structure can be easily determined and/or adjusted—preferably in two dimensions (e.g. mutually orthogonal dimensions) over the area of the first support frame in which the connection means are distributed or arranged. The connection means are preferably substantially equally spaced apart from one another in an array over an area of the first support frame and may, for example, be distributed in a grid-type arrangement. The number of the plurality of connection means is preferably greater than three, and more preferably greater than ten. For example, a grid-type array may comprise four or more rows and four or more columns of connection means, such that an array of twenty or thirty connection means may be provided on the first support frame. The higher the number of the connection means, the greater the flexibility available to the user in selecting the position at which to connect the display equipment to the first support frame.

In a preferred form of the invention, the mounting component comprises a bracket and includes an attachment portion for effecting rigid attachment of the mounting component to the display equipment. The attachment portion may, for example, comprise a plate member and preferably includes fastening means for rigidly fastening the plate member to the display equipment. The fastening means may, for example, comprise screws, which may be received in holes formed through the plate member.

In a preferred form of the invention, the mounting means on the mounting component comprises at least one securing member for securely connecting the mounting component (e.g. the bracket)—and, thereby, also the display equipment—to the first support frame. The at least one securing member may be selectively engaged and securely fastened with each of the plurality of connection means. In this respect, the form of each of the plurality of connection means is preferably complementary to the form of the securing member. The complementary nature of the securing member and connection means may comprise a male-female type of interconnection where, for example, the connection means includes a female connection member for receiving a male portion of the securing member. In this respect, the female connection member may comprise an aperture or hole for receiving a protruding portion of the securing member on the mounting component or bracket. For example, the securing member could comprise a threaded bolt which is adapted to be received by the female connecting member. The mounting means could, in that case, further include a fastener, such as a threaded nut, for rigidly fastening the securing member in the respective aperture or hole of the first support frame. It will be appreciated, however, that the mounting means and the connection means of the mounting system according to the invention are not limited to such a male-female type of interconnection, but that other types of interconnection are also contemplated.

In a preferred form of the invention, a male securing member of the mounting means is so received by a female connecting member of the first support frame that the first support frame supports and holds the mounting component (and the display equipment to which it is attached) before the securing member is rigidly fastened to the first support frame with a fastener. That is, in the example given above, a threaded male securing member may fit sufficiently snugly within the respective aperture or hole of the female connecting member that, under the weight of the display equipment, the threaded male member engages an edge or rim of the aperture or hole, which supports and holds the display equipment without attaching a fastening nut. This configuration of the mounting means and connection means is particularly advantageous as it enables the display equipment to be mounted and secured by one person.

In a preferred form of the invention, the support structure of the mounting system includes a second support frame, and the first support frame is adjustably movable relative to the second support frame to adjust the position of the display equipment relative to the support structure. In this regard, the first support frame may be adapted for adjustable linear movement (e.g. sliding movement) along at least one axis relative to the second support frame. The first support frame may be formed as an inner frame and the second support frame may be formed as an outer frame, such that the first support frame is adjustably movable within the second support frame of the support structure. In this regard, the first support frame may be adapted to be mounted within a recess or opening formed in the second support frame, and may be adjustably movable relative to the second support frame within that opening or recess.

In a preferred form of the invention, the first support frame is connected to the second support frame by interconnection means adapted to adjust the position of the first support frame along at least one axis (i.e. in at least one dimension) with respect to the second support frame, for example, by sliding movement, within the opening or recess mentioned above. The movement is desirably possible in both directions along the at least one axis. More preferably, the interconnection means is adapted to adjust the position of the first support frame along two axes (i.e. in two dimensions) with respect to the second support frame, with the two axes preferably being mutually perpendicular. The first support frame may comprises a substantially planar member, and the adjustable movement of the first support frame relative to the second support frame is desirably substantially in, or parallel to, the plane of that planar member. Thus, the adjustable movement is in at least one direction, preferably in at least two directions, and more preferably in at least four directions, in or parallel to a plane of the first support frame.

In a preferred form of the invention, the support structure further includes a security connection between the first support frame and the second support frame to ensure that an undesired separation of the first support frame from the second support frame cannot occur while the position of the first support frame is being adjusted relative to the second support frame.

The support structure preferably comprises one or more panel member, and the second support frame may be rigidly connected with such a panel member.

In a preferred form of the invention, the support structure of the mounting system further includes disposition setting means for setting and/or adjusting a disposition or orientation of the display equipment. In this regard, the disposition setting means is desirably adapted to set or adjust a spacing and/or an angular orientation of the display equipment in a third dimension relative to the support structure. This so-called third dimension is preferably in a direction perpendicular to a plane of the first support frame and/or is perpendicular to the directions in which the first support frame is movable with respect to the second support frame. The spacing and angular orientation of the display equipment to be set and/or adjusted by the disposition setting means are typically with respect to a main plane of the support structure, which typically corresponds to a vertical plane in space. Furthermore, the disposition setting means may be adapted to pre-set such a spacing or angular orientation before the display equipment is even mounted on the support structure. Thus, the disposition setting means is able to be used to alter the depth or spacing of a monitor from a main plane of the support structure, as well as an angle of tilt of the monitor relative to that plane. Ultimately, this corresponds to setting and/or adjusting the disposition or angular orientation of the monitor in space.

The disposition setting means preferably comprises at least one adjustment member on the support structure, with each adjustment member being movable to alter and set the spacing and/or angular orientation with respect to the main plane of the support structure. Preferably, each adjustment member is movable in a direction substantially perpendicular to the main plane of the support structure. In a particularly preferred form, each adjustment member comprises a screw element, the rotation of which acts to displace the first support frame (and thereby the display equipment attached thereto) relative to the main plane of the support structure. In one embodiment, at least two, and preferably four, screw-type adjustment members are provided for setting and/or adjusting the disposition or orientation of the display equipment. The disposition setting means is preferably provided on the second support frame.

In a preferred form of the invention, the second support frame comprises a fixed part adapted to be rigidly connected with one or more panel member within the support structure, and a movable part, the position and/or orientation of which can be set and/or adjusted by the disposition setting means relative to the fixed part. In such a case, the first support frame is desirably connected to the movable part of the second support frame so that setting and/or adjusting the disposition or orientation of the movable part of the second support frame thereby sets and/or adjusts a disposition or orientation of the display equipment mounted to the first support frame of the support structure.

Furthermore, in a particularly preferred form of the invention, the support structure comprises a plurality of first support frames provided in spaced relation from one another within the support structure. This facilitates the mounting and adjustment of a plurality of individual monitors or display screens, desirably in closest proximity to one another. In particular, the spacing between each first support frame within the support structure is selected to approximately correspond to a typical monitor size, whereby the position adjustment provided by the mounting system of the invention can accommodate normal size discrepancies.

According to another broad aspect, the present invention provides a mounting system for securely mounting display equipment, such as a monitor or a display screen, the mounting system comprising: a support structure to which the display equipment is to be mounted for thereby supporting the display equipment; and a mounting component adapted to be securely attached to the display equipment, the mounting component comprising mounting means for mounting the display equipment to the support structure. The support structure comprises a first support frame having connection means for secure connection with the mounting means of the mounting component, and a second support frame to which the first support frame is connected. The first support frame is adapted for adjustable sliding movement relative to the second support frame to adjust the position of the display equipment along at least one axis relative to the support structure.

As already explained above, the first support frame may be formed as an inner frame and the second support frame may be formed as an outer frame, with the first support frame adjustably movable within the second support frame. In particular, the first support frame may be adapted to be mounted within a recess or opening formed in the second support frame, and may be adjustably movable relative to the second support frame within that opening or recess.

With the mounting system of the invention described above, a rigid and reliable mounting of individual monitors and display screens for the medical environment can be achieved. The high degree of flexibility in adjusting the position and orientation of each monitor on the support structure enables a number of separate monitors to be mounted in proximity to one another for improved and unhampered visibility of the information displayed. In particular, the mounting system of the invention enables different types of monitors or display panels to be mounted adjacent one another with minimal gap there-between. That is, the flexibility available for adjusting the position and orientation of each monitor in multiple dimensions with the mounting system of the invention enables a number of monitors (even of different types) to be securely mounted next to one another at optimal positions and angular orientations and without any gaps between them. This obviates the need for a masking strip between the monitors and thus eliminates the hygiene problems that result from such strips.

Furthermore, the fact that the system of the invention enables a monitor to be placed in engagement with and held by the support structure before it is rigidly fastened thereto, combined with the ability to pre-set a particular disposition of a monitor before mounting it on the support structure, provides a substantial reduction in the time and effort required for installation of the monitors. In addition, the assembly and adjustment can be readily performed by a single person.

The mounting system of the present invention has the further advantage that, if a monitor of an assembly needs to be replaced for service or maintenance, that single monitor can be quickly and easily demounted and replaced with little or no readjustment to the mounting system being required.

For assistance in arriving at an understanding of the present invention, preferred embodiments of the mounting system of the invention are hereinafter described with reference to the accompanying drawings. The preceding description of the invention may be read with reference to those drawings. It will be appreciated, however, that the drawings illustrate examples only and do not supercede the generality of the foregoing description.

BRIEF DESCRIPTION OF THE DRAWINGS

Thus, the above and further features and advantages of the invention will become more apparent from the following detailed description of preferred embodiments of the invention with reference to the accompanying drawings, in which like reference characters identify like parts throughout the several views, and in which.

DETAILED DESCRIPTION OF THE PREFERRED EMBODIMENTS

Figure 1:
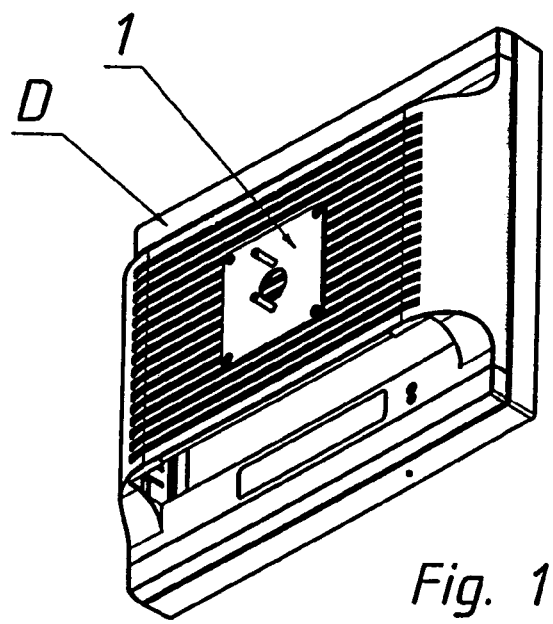
FIG. 1 shows a perspective view of a mounting component from a mounting system according to an embodiment of the present invention, the mounting component being rigidly attached to the rear side of a monitor.

With reference to FIG. 1 of the drawings, a mounting component 1 of a mounting system according to a preferred embodiment of the invention is shown rigidly attached to a rear side of display equipment. The display equipment comprises a computer monitor or an LCD display screen, hereinafter simply referred to as the display device D. The mounting component 1 is formed as a bracket member.

Figure 2:
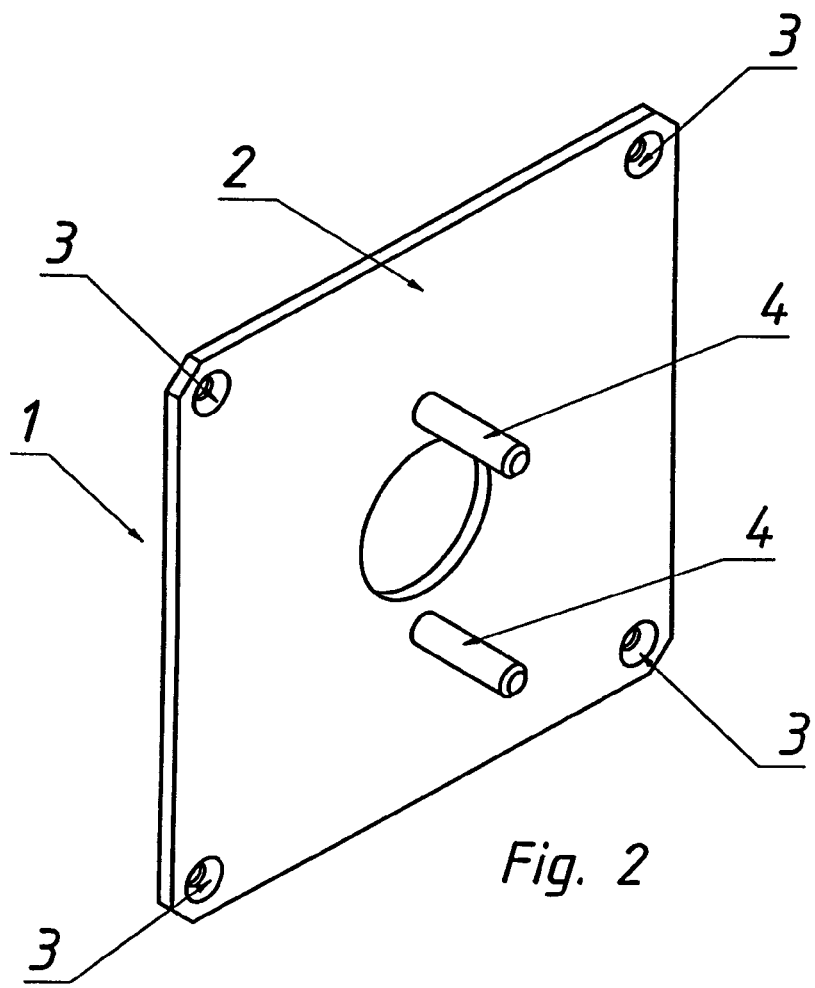
FIG. 2 shows a closer perspective view of the mounting component from FIG. 1.

As can be seen in more detail in FIG. 2 of the drawings, the bracket member 1 comprises an attachment portion in the form of a plate member 2 for effecting rigid attachment of the bracket member 1 to the rear side of the display device D. Fastening means in the form of screw elements are received in holes 3 provided in each of the four corners of the plate member 2. The screw elements are then screwed into the rear side of the display device D to fasten the plate member 2 and thereby rigidly attach the bracket member 1 to the display device.

The mounting component or bracket member 1 is preferably VESA® compliant. In this regard, VESA® is a Flat Panel Monitor Physical Mounting Interface Standard (FP-MPMI™) defining a standardized hole pattern. Manufacturers include this hole pattern on the back of their displays for mounting purposes. Typically, a VESA® hole pattern for displays under 23" diagonal is sized either 75 mm×75 mm or 100 mm×100 mm. Being VESA® compliant, the mounting component 1 is readily adaptable to most flat-screen video displays generally available on the market.

As can also be clearly seen in FIG. 2, the bracket member 1 includes means for mounting the display device D to a support structure to be described in detail later. The mounting means comprises two securing members 4 in the form of threaded bolts, which project from a central region of the plate member 2 rearwardly of the display device. The two rearwardly projecting securing bolts 4 are rigidly connected to the plate member 2, for example, by welding. In this regard, the bracket member 1, including the plate member 2 and the securing bolts 4, is desirably fabricated from a relatively rigid and robust material, and preferably from a metal, such as steel. Accordingly, the bracket member 1 will typically have an integral and rigid construction.

Figure 3:
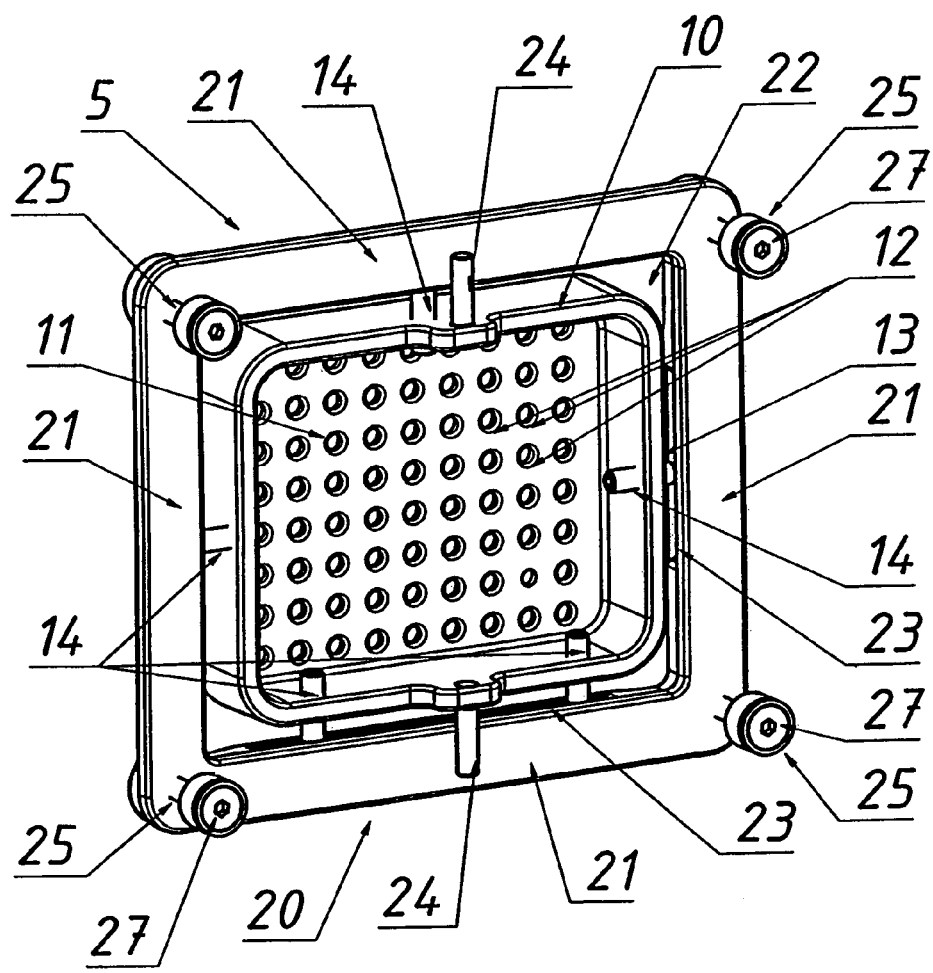
FIG. 3 shows a perspective view from a rear side of a support structure of a mounting system according to the embodiment of the invention.
Figure 4:
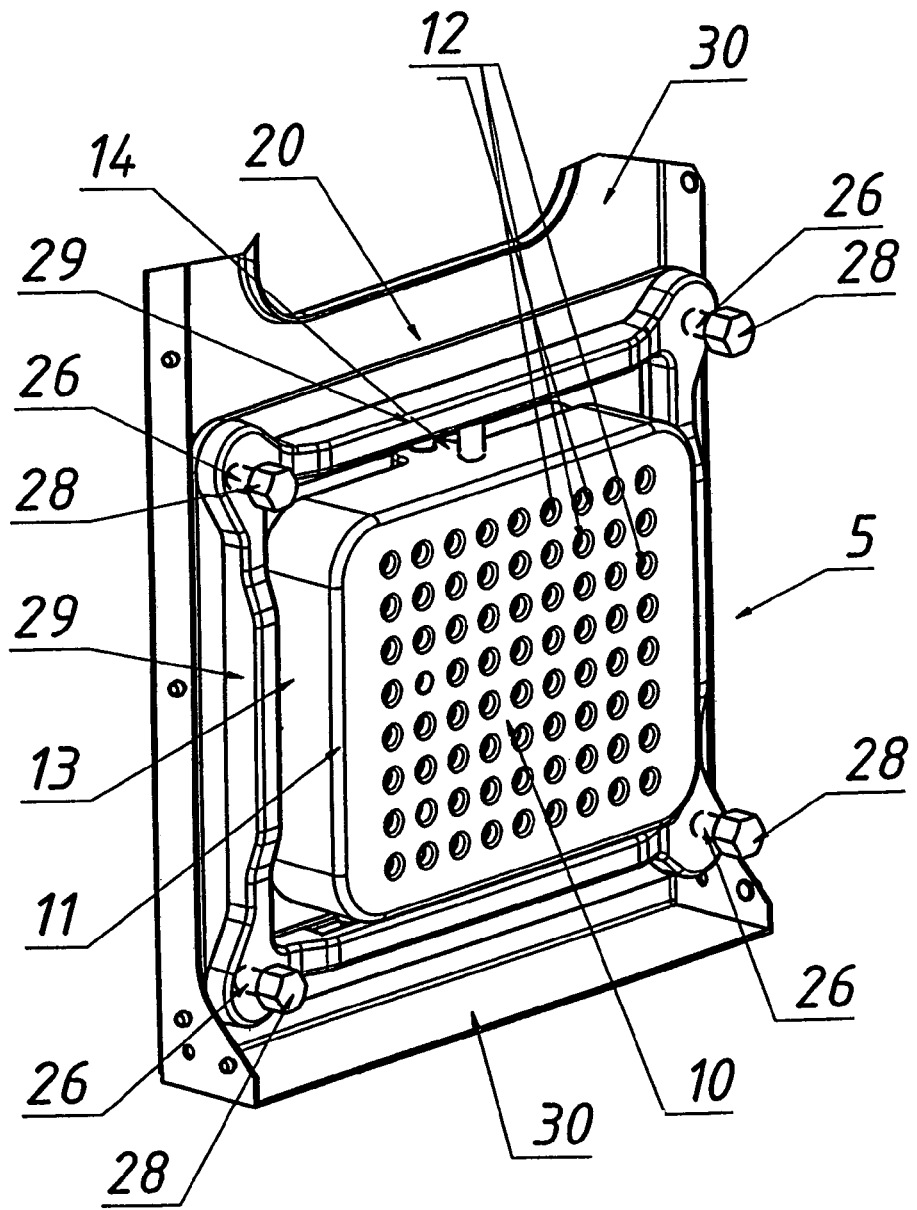
FIG. 4 shows a perspective view from a front side of the support structure of the mounting system shown in FIG. 3.

With reference to FIG. 3 and FIG. 4 of the drawings, a supporting structure 5 of the mounting system according to this embodiment of the invention will now be described. The supporting structure 5 comprises a rigid framework which, like the bracket member 1, is typically fabricated from a relatively rigid and robust material, e.g. a metal, such as steel. The supporting structure 5 comprises a first support frame 10, which includes a substantially planar plate member 11 having a plurality of holes 12 formed therein for selectively receiving and engaging with the securing bolts 4 of the bracket member 1. In other words, the plurality of holes 12 formed in the substantially planar plate member 11 of the first support frame 10 comprise connection means arranged and adapted for selective connection with the mounting means of the bracket member 1. The plurality of holes 12 in the first support frame 10 are distributed substantially equally spaced in a rectangular 9×8 grid-like array over an area of the plate member 11 to provide a collection of regularly spaced alternative positions for mounting the display device D to the first support frame 10. That is, the plurality of holes 12 provide alternative positions for mounting the display device D across a lateral or horizontal dimension of the plate member 11 as well as in a vertical dimension of the plate member 11. Thus, by selecting which of the holes 12 are to be used for receipt of and connection with the securing bolts 4 of the bracket member 1, an operator can determine and adjust the position of the display device D on the support structure 5 in two dimensions (i.e. horizontally and vertically) over an area of the substantially planar plate member 11.

To mount a display device D according to this embodiment of the invention, the display device D having the bracket member 1 rigidly attached thereto (as shown in FIG. 1) is lifted into a desired position adjacent the first support frame 10 of the support structure 5, with the securing bolts 4 projecting rearwardly from the display device D towards the front side of the plate member 11 shown in FIG. 4. The securing bolts 4 are then aligned with and inserted through two respective holes 12 formed in the plate member 11 so that the bracket member 1 and the display device D are located in the desired position on the support structure 5.

Because the securing bolts are elongate and designed to fit in holes 12 with relatively little 'play', and because the plate member 11 is rigid and of robust construction, the plate member 11 of the first support frame 10 will support and hold the display device D in this position while the person assembling the mounting system proceeds to fasten the display device to the support structure 5 securely. That is, the person assembling the system can release the display device D after the securing bolts 4 are received within the associated holes 12. The securing bolts 4 will engage edges of the holes 12 and not allow the display device D to slip out. Thus, the operator is able to move around to the rear side of the support structure 5 and attach a fastening nut (not shown) onto the free end of each of the securing bolts 4 to tighten and rigidly fix the bracket member 1 and display device D to the first support frame 10 without fear that the display device D will fall when released from his/her grasp. This facilitates the assembly of the mounting system by a single person.

With further reference to FIGS. 3 and 4 of the drawings, the support structure 5 is seen to include a second support frame 20, which includes integrally formed elongate members 21 which essentially surround the first support frame 10 and have a generally rectangular configuration. The second support frame 20 thereby forms or encloses an opening or recess 22 within which the first support frame 10 is mounted. The first support frame 10 comprises a flange or edge member 13, which is integral with the plate member 11 and extends around a periphery thereof to form a means for interconnection with the second support frame 20. This interconnection with the second support frame 20 at the flange or edge member 13 is provided such that the position of the first support frame 10 is adjustably movable relative to the second support frame 20, thereby providing means for further adjusting the overall position of the display device D on the support structure 5.

Explained in more detail, the first support frame 10 is connected to the second support frame 20 via a number of screw elements 14 which extend through the flange or edge member 13 and which engage with, or are received in, slots or grooves 23 that effectively form linear tracks in the second support frame 20. Thus, by adjusting the screw elements 14, it is possible to move the first support frame 10 within the recess or opening 22 along the directions or axes formed by the track-like slots or grooves 23 formed in the second support frame 20. For example, by adjusting (i.e. turning) the upper and lower screw elements 14, the first support frame 10 can be drawn upwards or downwards within the recess or opening 22. Similarly, by adjusting the side screw elements 14, the first support frame 10 can be displaced sideways relative to the second support frame 20. Thus, the screw elements 14 provide a degree of "fine tuning" in the position of the display device D substantially parallel to the plane of the plate member 11. In this way, the selected holes 12 in the plate member 11 may provide an approximate desired positioning of the display device D, and the screw elements 14 may be adjusted to provide a more precise desired positioning.

To ensure that the first support frame 10 and the second support frame 20 are not able to separate from one another completely when the screw elements 14 are manipulated to adjust the position of the first support frame 10 relative to the second support frame 20, upper and lower security bolts 24 provide a security connection between the first support frame 10 and the second support frame 20. In this way, even if one or more of the screw elements 14 is/are mistakenly removed from the support structure 5, the first support frame 10 carrying the display device D will be prevented from falling out of the support structure 5.

With reference again to FIGS. 3 and 4, it will be noted that the support structure 5 further includes means 25 for setting and/or adjusting a disposition or orientation of the display device D. The disposition setting means 25 comprises four adjustment members 26 provided on the second support frame 20. These four adjustment members 26 are arranged spaced apart from one another in a rectangular configuration around the first support frame 10 and each of the adjustment members 26 comprises a set-screw. By rotating each set-screw, the thread thereof acts to cause a displacement either inwards or outwards along a direction of the thread axis; namely, a direction substantially perpendicular to the plane of the plate member 11 of the first support frame 10, and thus substantially perpendicular to a primary plane of the supporting structure 5. The adjustment members of the disposition setting means 25 thereby enable the position of the display device D to be varied in a third dimension which is perpendicular to the dimensions of adjustment available via the holes 12 in the plate member 11 and/or via the screws 14 and the track-like slots or grooves 23. Thus, while the holes 12 in the plate member 11 and the screws 14 with the track-like slots or grooves 23 in the second support frame 20 each provide for linear translational displacements of the display device D in two dimensions, the four adjustment members 26 at the corners of the second support frame 20 provide both a linear translational displacement of the display device D in the third dimension, as well as a rotational or pivotal displacement of the device in three dimensional space.

As can be seen from FIG. 4, the support structure 5 further comprises at least one panel member 30 to which the second support frame 20 is rigidly attached. in this regard, one end region 27 of each of the set-screw adjustment members 26 is received in and fixed relative to the panel member 30. Accordingly, this end region 27 of the set-screws 26 is accessible from the rear side of the panel member 30 to turn and adjust the set-screw. The other end region 28 of each set-screw adjustment member 26 terminates at a rounded hexagonal bolt head on a front side of the second support frame 20. From a closer inspection of FIG. 3 and FIG. 4, it will be seen that the front part of the second support frame 20 comprises a rectangular arrangement of elongate members 29 and that the track-like slots or grooves 23 of the second support frame 20 are formed within these elongate members 29. The first support frame 10 is thus slidably connected to this part of the second support frame 20 comprising the rectangular arrangement of elongate members 29.

When a set-screw adjustment member 26 is rotated, its screw thread operates to displace or move this part of the second support frame 20 (i.e. comprising the rectangular arrangement of elongate members 29) at the location of that particular set-screw. As noted above, depending on the direction the set-screw is rotated, the displacement or movement will be either outwards or inwards in a direction perpendicular to the primary (vertical) plane of the panel member 30. Thus, by individually adjusting each set-screw 26, the corner regions of the rectangular framework of elongate members 29 can be individually positioned in the third dimension, such that the disposition of the first support frame 10, and thereby also the display device D, can be set or determined. In particular, a lateral spacing and/or an angular orientation of the display device D relative to the primary (i.e. vertical) plane of the panel member 30 can be set and/or adjusted. Indeed, it is possible to pre-set the spacing and/or angular orientation to be adopted by the display device D even before the display device D is mounted on the supporting structure 5. The arrangement of elongate members 29 thus forms a part of the second support frame 20 which is movable relative to the rectangular configuration of elongate members 21 secured to the panel member 30. The size of the maximum spacing and/or maximum angle of tilt achievable with the adjustment members 26 will depend upon the length of the threaded portion of the set-screws.

Figure 5:
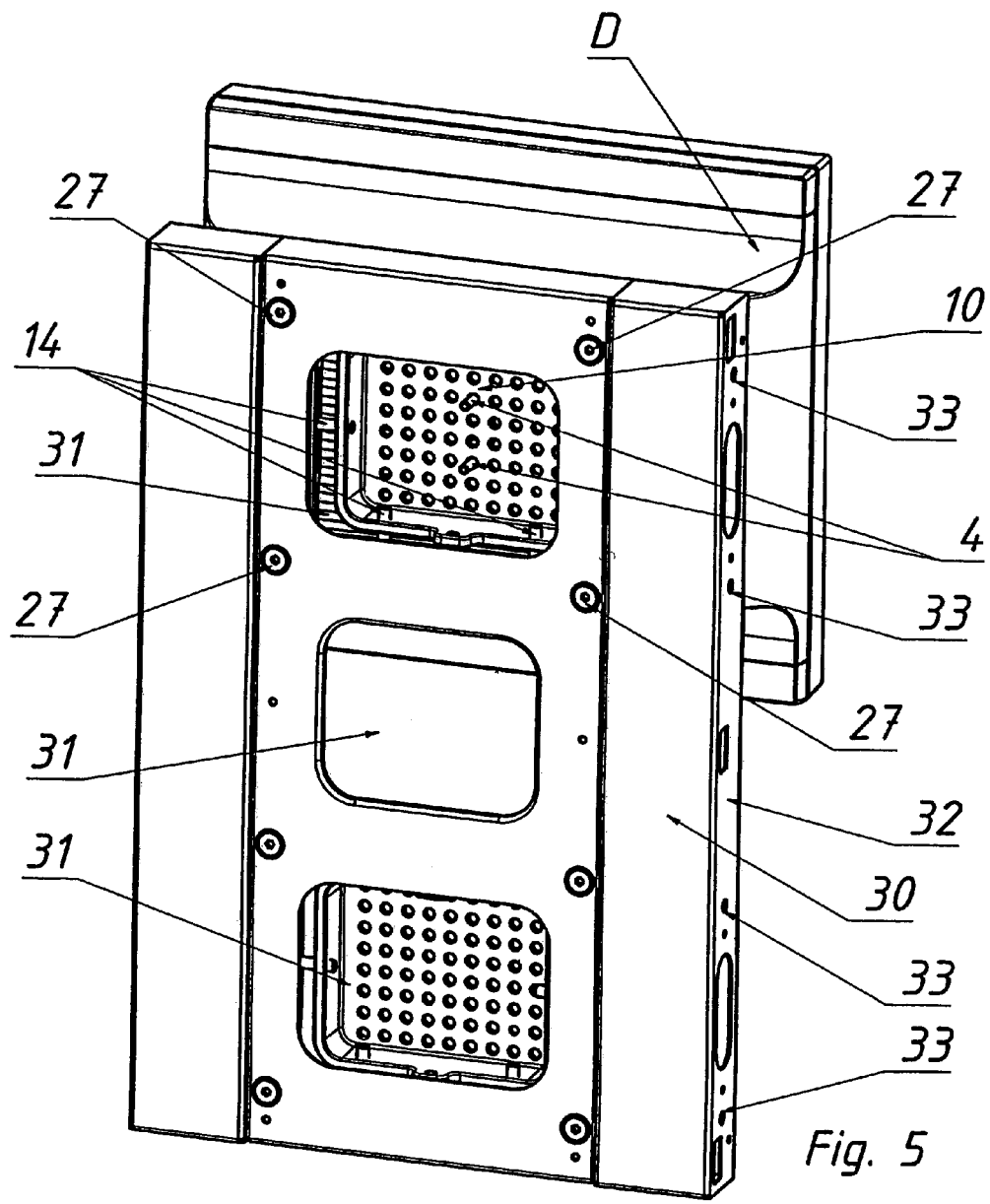
FIG. 5 shows a perspective view from the rear side of the mounting system according to the embodiment of the invention.
Figure 6:
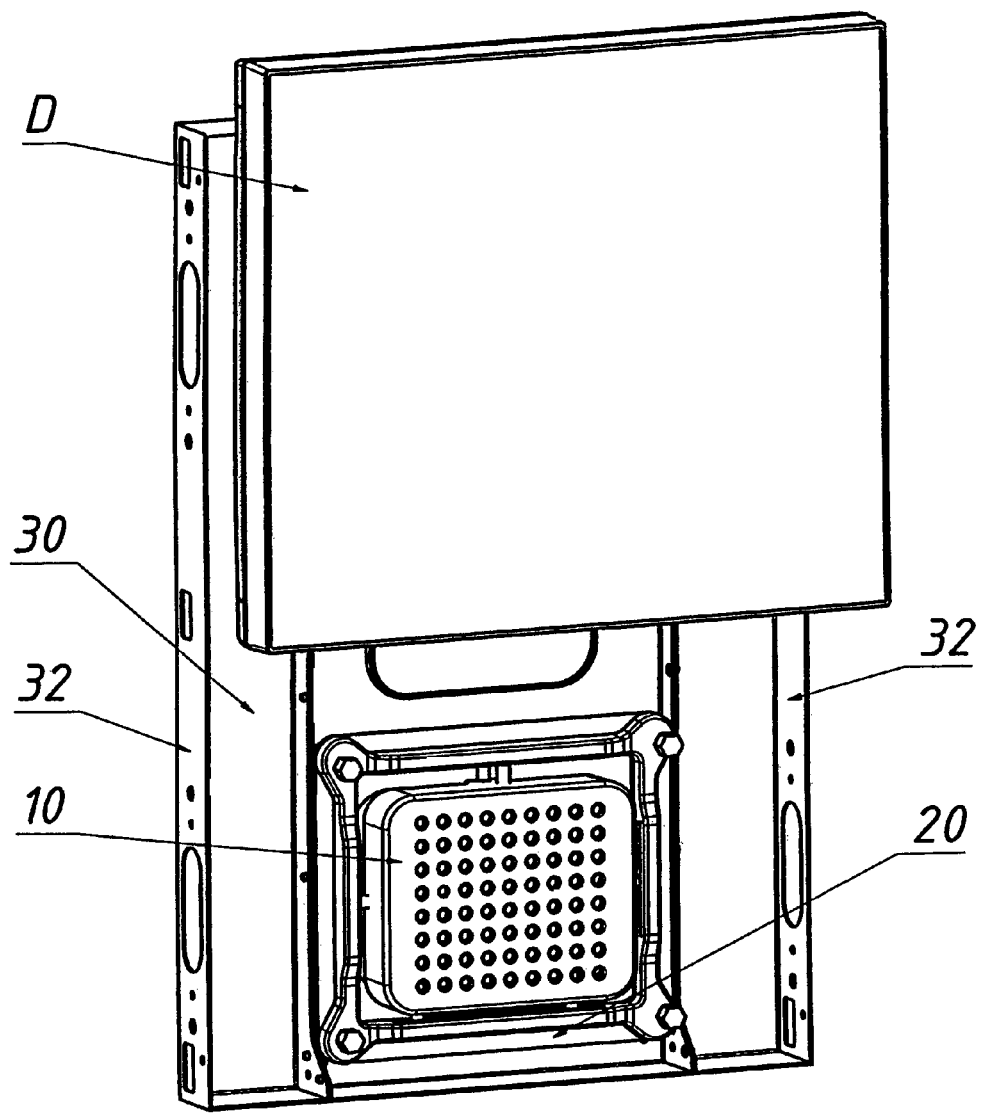
FIG. 6 shows a perspective view of from the front side of the mounting system according to the embodiment of the invention.

With reference now to FIGS. 5 and 6 of the drawings, the mounting of a display device D according to this embodiment of the system of the invention is illustrated. In this particular embodiment, the panel member 30 is adapted to support two first support frames 10 (and therefore also two second support frames 20) in spaced relation from one another such that two display devices D may be mounted adjacent one another. Each first support frame 10 and second support frame 20 preferably form a unit of the mounting system support structure 5, as shown in FIG. 3 of the drawings.

As can be seen in FIG. 5, the panel member 30 includes openings 31, through which a rear side of the first support frame 10 is accessible. The two securing bolts 4 of the bracket member 1 have been inserted through two of the plurality of holes 12 formed in the plate member 11 of the upper first support frame 10, thereby to select or determine a desired position of the display device D with respect to the support structure 5. The opening 31 in the panel 30 thus enables a person to attach threaded nuts (not shown) onto the free ends of each of the securing bolts 4 from the rear side of the panel member 30 to securely fix the display device D to the first support frame 10. Furthermore, the opening 31 allows rear access to the screw elements 14 to effect sliding adjustment of the first support frame 10 in the up or down or sideways directions relative to the surrounding second support frame 20. In addition, the set-screws of the disposition setting means 25 may be adjusted to alter or set a desired spacing or angle of the display device D relative to the main plane of the panel member 30. That is, the rearward end regions 27 of the set-screw adjustment members 26 are accessible from the rear side of the panel 30 for rotating the set-screws with an appropriate tool.

As is also apparent from FIGS. 5 and 6 of the drawings, the panel member 30 has a connection flange 32 formed along its longitudinal edges. The connection flange 32 includes a number of apertures and holes 33 for receiving fasteners so that a plurality of such panel members 30 may be connected with one another in an extended support structure 5. In other words, the support structure 5 of the mounting system according to this embodiment of the invention may comprise a plurality of panel members 30 adapted for connection with one another.

Thus, the present invention provides a system for mounting display equipment, such as one or more computer monitor or display screen, in a medical environment, like a hospital or private medical practice. The support structure of the system may be adapted to be floor-mounted, wall-mounted, or may, alternatively, have a pendant design adapted to be suspended from a ceiling. In this regard, the support structure may include one or more arm arrangement or framework to which the support frame(s) or panel member(s) is/are attached. The support structure of the mounting system may, in some embodiments, be movable (e.g. pivotable) within the space in which it is deployed or installed, although such movable arrangements are preferably designed to be locked in a fixed position during use. Further, the support structure of the mounting system desirably provides access to its rear side to facilitate mounting of the display equipment, as discussed earlier.

Finally, it will be appreciated that the above embodiment of the present invention described with reference to the accompanying drawings represents only one particular example of the invention and that modifications to the parts particularly described may be made without departing from the scope of the invention as defined in the appended claims.

The invention claimed is:

1. Mounting system for securely mounting display equipment, such as a monitor or a display screen, the mounting system comprising:
   a support structure to which the display equipment is to be mounted to thereby support the display equipment; and
   a mounting component adapted to be securely attached to the display equipment, the mounting component comprising mounting means for mounting the display equipment to the support structure;
   the support structure comprising a first support frame having a plurality of connection means for secure connection with the mounting means of the mounting component, and a second support frame to which the first support frame is connected;
   wherein the plurality of connection means are arranged on the first support frame for selective connection with the mounting means to select and/or adjust the position of the display equipment on the support structure in two dimensions; and
   wherein the first support frame is adjustably movable along at least one axis relative to the second support frame to further adjust the position of the display equipment.

2. Mounting system according to claim 1, wherein the first support frame is adapted for adjustable movement along two axes relative to the second support frame to further adjust the position of the display equipment, said two axes preferably being mutually perpendicular.

3. Mounting system according to claim 1, wherein the first support frame is adapted for adjustable linear or sliding movement relative to the second support frame via interconnection means comprising:
   at least one track or groove attached to, or provided on or in one of the first and second frames, and
   at least one follower attached to, or provided on or in the other of the first and second frames,
   wherein the at least one track or groove defines the at least one axis and the follower is adapted for movement along the track or groove.

4. Mounting system according to claim 3, wherein the interconnection means comprises at least two tracks or grooves respectively defining two axes, along which the position of the first support frame is adjustable relative to the second support frame.

5. Mounting system according to claims 1, wherein the adjustable movement of the first support frame relative to the second support frame is effected by one or more screw actuator.

6. Mounting system according to claim 1, wherein the plurality of connection means are distributed in an array over an area of the first support frame for selective connection with the mounting means, with each of the plurality of connection means being adapted to engage and securely fasten with the mounting means of the mounting component.

7. Mounting system according to claim 6, wherein the array comprises a rectangular grid of the connection means distributed over an area of the first support frame, the grid preferably comprising more than three rows and more than three columns of the connection means.

8. Mounting system according to claim 1, wherein the plurality of the connection means comprise female connection members, each of which is adapted to receive a male connection member of the mounting means.

9. Mounting system according to claim 1, wherein the first support frame is mounted within a recess or opening formed in the second support frame, and is movable relative to the second support frame within that opening or recess.

10. Mounting system according to claim 1, wherein the support structure further comprises one or more panel member, and the second support frame is adapted to be rigidly connected with the panel member.

11. Mounting system according to claim 1, wherein the support structure further comprises disposition setting means for setting and/or adjusting a disposition or orientation of the display equipment, the disposition setting means being adapted to set and/or adjust a spacing and/or an angular orientation of the equipment in a third dimension with respect to the support structure.

12. Mounting system according to claim 11, wherein the disposition setting means comprises at least one adjustment member on the support structure, said at least one adjustment member being movable in a direction substantially perpendicular to the said two dimensions and/or to a plane of the support structure to set and/or adjust the disposition or orientation of the display equipment.

13. Mounting system according to claim 12, wherein the at least one adjustment member comprises a screw element, rotation of which displaces the first support frame relative to the support structure.

14. Mounting system according to claim 11, wherein the disposition setting means is provided on the second support frame.

15. Mounting system according to claim 14, wherein the second support frame comprises a fixed part adapted to be rigidly connected within the support structure, and a movable part, wherein the position and/or orientation of the movable part relative to the fixed part is adapted to be set and/or adjusted by the disposition setting means.

16. Mounting system according to claim 15, wherein the first support frame is connected to the movable part of the second support frame, such that setting and/or adjusting the disposition or orientation of the movable part of the second support frame thereby sets and/or adjusts a disposition or orientation of the display equipment mounted to the first support frame of the support structure.

17. Mounting system according to claim 1, wherein the support structure comprises more than one of said first support frame, the plurality of first support frames being arranged in spaced relation from one another within the support structure.

18. Mounting system for securely mounting display equipment, such as a monitor or a display screen, the mounting system comprising:
   a support structure to which the display equipment is to be mounted for thereby supporting the display equipment; and
   a mounting component adapted to be securely attached to the display equipment, the mounting component comprising mounting means for mounting the display equipment to the support structure;
   the support structure comprising a first support frame having connection means for secure connection with the mounting means of the mounting component, and a second support frame to which the first support frame is connected;
   wherein the first support frame is adjustably movable relative to the second support frame along two axes to adjust the position of the display equipment relative to the support structure in two dimensions.

19. Mounting system according to claim 18, wherein the two axes are mutually perpendicular axes.

20. Mounting system according to claim 18, wherein the first support frame is connected to the second support frame by interconnection means comprising:

at least two tracks or grooves attached to, or provided on or in one of the first and second frames, and at least two followers attached to, or provided on or in the other of the first and second frames, wherein the tracks or grooves respectively define the two axes and each of the followers is adapted for movement along a respective one of the tracks or grooves.

21. Mounting system according to claims 18, wherein the first support frame comprises a plurality of connection means for secure connection with the mounting means of the mounting component, and wherein the plurality of connection means are arranged on the first support frame for selective connection with the mounting means to select and/or adjust the position of the display equipment on the support structure in two dimensions.

22. Mounting system according to claim 18, wherein the adjustable movement of the first support frame relative to the second support frame is effected by one or more screw actuator.

23. Mounting system according to claim 18, wherein the support structure comprises more than one of said first support frame, the plurality of first support frames being arranged in spaced relation from one another within the support structure.

24. Mounting system according to claim 18, wherein the plurality of connection means are distributed in an array over an area of the first support frame for selective connection with the mounting means, with each of the plurality of connection means being adapted to engage and securely fasten with the mounting means of the mounting component.

25. Mounting system according to claim 24, wherein the array comprises a rectangular grid of the connection means distributed over an area of the first support frame, the grid preferably comprising more than three rows and more than three columns of the connection means.

26. Mounting system according to claim 18, further comprising at least one adjustment member provided on the support structure, the at least one adjustment member being movable in a direction substantially perpendicular to said two dimensions and/or to a plane of the support structure for setting and/or adjusting a spacing and/or an angular orientation of the equipment in a third dimension with respect to the support structure.

27. Mounting system according to claim 26, wherein the at least one adjustment member comprises a screw element, rotation of which displaces the first support frame relative to the support structure.

28. Mounting system according to claim 26, wherein the second support frame has a fixed part adapted to be rigidly connected within the support structure, and a movable part, wherein the position and/or orientation of the movable part relative to the fixed part is adapted to be set and/or adjusted by the at least one adjustment member.

29. Mounting system for securely mounting display equipment, such as a monitor or a display screen, the mounting system comprising:

a support structure to which the display equipment is to be mounted to thereby support the display equipment; and a mounting component adapted to be securely attached to the display equipment, the mounting component comprising mounting means for mounting the display equipment to the support structure;

the support structure comprising a first support frame having a plurality of connection means for secure connection with the mounting means of the mounting component, and disposition setting means for setting and/or adjusting a disposition or orientation of the display equipment;

wherein the plurality of connection means are arranged and adapted for selective connection with the mounting means thereby to select and/or adjust the position of the display equipment in two dimensions on the support structure; and wherein the disposition setting means is adapted to set and/or adjust a spacing and/or an angular orientation of the equipment in a third dimension with respect to the support structure.

* * * * *